(12) United States Patent
Van Bommel et al.

(10) Patent No.: US 10,753,577 B2
(45) Date of Patent: Aug. 25, 2020

(54) LIGHTING DEVICE

(71) Applicant: PHILIPS LIGHTING HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDINGS B.V., Eindhoven (NL)

( * ) Notice: Subject to any disclaimer, the term of this patent is extended or adjusted under 35 U.S.C. 154(b) by 0 days.

(21) Appl. No.: 16/068,143

(22) PCT Filed: Jan. 13, 2017

(86) PCT No.: PCT/EP2017/050674
§ 371 (c)(1),
(2) Date: Jul. 5, 2018

(87) PCT Pub. No.: WO2017/125322
PCT Pub. Date: Jul. 27, 2017

(65) Prior Publication Data
US 2019/0024874 A1    Jan. 24, 2019

(30) Foreign Application Priority Data

Jan. 19, 2016   (EP) ................................ 16151896

(51) Int. Cl.
*F21V 9/00* (2018.01)
*F21V 13/08* (2006.01)
(Continued)

(52) U.S. Cl.
CPC .............. *F21V 13/08* (2013.01); *G02B 5/203* (2013.01); *G02B 5/208* (2013.01);
(Continued)

(58) Field of Classification Search
CPC ... F21V 13/08; F21V 9/00; F21V 7/28; F21V 7/30; F21V 9/30; G02B 19/0061; G02B 5/208; G02B 5/203; G02B 19/0023; G02B 2005/1804; G02B 5/0294; G02B 5/0278; G02B 5/0247; G02B 5/0236;
(Continued)

(56) References Cited

U.S. PATENT DOCUMENTS 6,417,019 B1 * 7/2002 Mueller ............. C09K 11/7731
257/100
8,610,340 B2 * 12/2013 Yuan ..................... H01L 33/504
313/112

(Continued)

FOREIGN PATENT DOCUMENTS

CN   102109147 A   6/2011
TW   200925650 A   6/2009
(Continued)

*Primary Examiner* — William J Carter
*Assistant Examiner* — Omar Rojas Cadima
(74) *Attorney, Agent, or Firm* — Daniel J. Piotrowski

(57) ABSTRACT

The present invention relates to a lighting device (12) comprising at least one light source (12a, 12b) adapted to emit white light and ultraviolet light, a collimator (18) adapted to collimate the white light, and a light exit window (16) through which the collimated white light and the ultraviolet light may pass into the ambient, wherein the lighting device is adapted to emit the collimated white light while spreading the ultraviolet light.

13 Claims, 5 Drawing Sheets

(51) Int. Cl.
*G02B 5/20* (2006.01)
*G02B 19/00* (2006.01)
*F21Y 115/10* (2016.01)
*F21Y 113/13* (2016.01)
*F21W 131/20* (2006.01)
*G02B 5/02* (2006.01)
*G02B 5/18* (2006.01)
*F21Y 115/30* (2016.01)
*F21V 7/28* (2018.01)
*F21V 7/30* (2018.01)
*F21V 9/30* (2018.01)

(52) U.S. Cl.
CPC ..... *G02B 19/0023* (2013.01); *G02B 19/0061* (2013.01); *F21V 7/28* (2018.02); *F21V 7/30* (2018.02); *F21V 9/00* (2013.01); *F21V 9/30* (2018.02); *F21W 2131/20* (2013.01); *F21Y 2113/13* (2016.08); *F21Y 2115/10* (2016.08); *F21Y 2115/30* (2016.08); *G02B 5/0236* (2013.01); *G02B 5/0247* (2013.01); *G02B 5/0278* (2013.01); *G02B 5/0294* (2013.01); *G02B 2005/1804* (2013.01)

(58) Field of Classification Search
CPC .............. F21Y 2115/30; F21Y 2113/13; F21Y 2115/10; F21W 2131/20
See application file for complete search history.

(56) References Cited

U.S. PATENT DOCUMENTS

| | | | |
|---|---|---|---|
| 2007/0086912 A1 | 4/2007 | Dowling et al. | |
| 2010/0007267 A1* | 1/2010 | Imai | F21V 5/005 313/503 |
| 2013/0154519 A1 | 6/2013 | Riesebosch | |
| 2014/0160728 A1 | 6/2014 | Kim et al. | |
| 2014/0192509 A1 | 7/2014 | Di Trapani et al. | |
| 2014/0268631 A1* | 9/2014 | Pickard | F21K 9/64 362/84 |
| 2014/0319553 A1* | 10/2014 | Ye | H01L 33/0004 257/89 |
| 2015/0014715 A1* | 1/2015 | Hsing Chen | H01L 25/0753 257/89 |

FOREIGN PATENT DOCUMENTS

| | | |
|---|---|---|
| WO | 2010015990 A2 | 2/2010 |
| WO | 2013011410 A1 | 1/2013 |
| WO | 2013011427 A1 | 1/2013 |
| WO | 2015015363 A1 | 2/2015 |

* cited by examiner

LIGHTING DEVICE

CROSS-REFERENCE TO PRIOR APPLICATIONS

This application is the U.S. National Phase application under 35 U.S.C. § 371 of International Application No. PCT/EP2017/050674, filed on Jan. 13, 2017 which claims the benefit of European Patent Application No. 16151896.4, filed on Jan. 19, 2016. These applications are hereby incorporated by reference herein.

FIELD OF THE INVENTION

The present invention relates to a lighting device comprising at least one light source adapted to emit white light.

BACKGROUND OF THE INVENTION

Artificial white light is being adopted at a high rate. Such light sources can produce high quality light with a CRI (color rendering index) beyond 90 with very high efficiencies. However, one of the problems of such light sources as compared with sun light is the absence of certain parts of the spectrum which have specific benefits to humans beyond providing visible light. For example, UV light (albeit at very low intensities) is very important for production of vitamin D (or for skin tanning, insect attraction, skin treatment, etc.). For this purpose, it is possible to introduce a UV LEDs in combination with white LEDs.

US2014160728 discloses a light emitting device which comprises: a plurality of light emitting devices including a blue light emitting device emitting blue light and a UV light emitting device emitting ultraviolet light; and a wavelength conversion part arranged in the path of the light emitted from the plurality of light emitting devices, and provided with fluorescent substances to convert the wavelengths of the light emitted from the plurality of light emitting devices, wherein a fluorescent substance excited by and mixed with the blue light to obtain white light is arranged on a first area corresponding to the blue light emitting device, and at least a blue fluorescent substance is arranged on a second area corresponding to the UV light emitting device.

However, UV point light sources are very harmful to the skin and if a person touches or come close to it for too long it can lead to different problems. Also it is uncomfortable to look into light source with a high glare.

SUMMARY OF THE INVENTION

It is an object of the present invention to overcome or at least alleviate the aforementioned problems, and to provide an improved lighting device.

According to an aspect of the invention, this and other objects are achieved by a lighting device comprising at least one light source adapted to emit white light and ultraviolet light, a collimator adapted to collimate the white light, and a light exit window through which the collimated white light and the ultraviolet light may pass into the ambient, wherein the lighting device is adapted to emit the collimated white light while spreading the ultraviolet light.

The lighting device being adapted to emit the collimated white light while spreading the ultraviolet light may mean that the ultraviolet light is spread to larger angles than the collimated white light, wherein 'angles' refer to the direction of light relative to the normal of the light exit window. In other words, the ultraviolet light or UV component may be spread out to angular range greater than the collimated white light.

The present invention is based on the understanding that by spreading the ultraviolet light, a combined white and UV lighting device may be provided, wherein the ultraviolet light is harmless or at least less harmful. Furthermore, since the white light is collimated, glare for the white light may be eliminated or at least reduced.

For spreading the ultraviolet light, the light exit window may be spectrally selective. The light exit window may for example be a spectrally selective layer (e.g. a coating on a plate) or a spectrally selective plate.

In one embodiment, the light exit window is adapted to scatter the ultraviolet light while allowing the white light to pass without (substantial) scattering. The light exit window may here for example comprise hollow spheres with suitable size (distribution) in combination with a suitable matrix material such as a polymer, for example silicone.

In another embodiment, light exit window is adapted to diffract the ultraviolet light while allowing the white light to pass without (substantial) diffraction. The light exit window may here for example comprise a wavelength selective diffractive grating.

In another embodiment, the light exit window is adapted to reflect ultraviolet light having an angle of incidence smaller than a predefined angle and to transmit ultraviolet light having an angle of incidence larger than the predefined angle and to transmit white light having an angle of incidence smaller than the predefined angle. The light exit window may here for example comprise a dichroic mirror.

In another embodiment, the light exit window is adapted to convert the ultraviolet light into ultraviolet light having a peak at a higher wavelength without converting the white light. The light exit window may here for example comprise a phosphor layer.

In other embodiments, the ultraviolet light may be spread at the collimator level. That is, the collimator may be spectrally selective. The collimator may for example be a reflector or a total internal reflection optical element.

In one embodiment, the collimator comprises (small) particles adapted to scatter the ultraviolet light without (substantially) scattering the white light, i.e. light in the visible range.

In another embodiment, the collimator comprises a stack of a specular reflective coating and a diffuse reflective coating, wherein the specular reflective coating is adapted to specularly reflect the white light and is transparent for the ultraviolet light, and wherein the diffuse reflective coating is adapted to diffusively reflect the ultraviolet light. The specular reflective coating may for example be a silver coating. The diffuse reflective coating may for example be an aluminium coating on a rough surface.

In another embodiment, the collimator comprises a stack of a scattering layer and a layer with a specular reflective coating, wherein the scattering layer is adapted to scatter the ultraviolet light, and wherein the specular reflective coating is adapted to specularly reflect both the white light and the ultraviolet light. The scattering layer may for example comprise UV reflecting particles. The specular reflective coating may for example be an aluminium coating.

In another embodiment, the collimator comprises a spectrally selective layer adapted to diffract the ultraviolet light without (substantially) diffracting the white light.

In another embodiment, the collimator comprises a spectrally selective layer adapted to convert the ultraviolet light into ultraviolet light having a peak at a higher wavelength without converting the white light.

In yet another embodiment, the at least one light source comprises a first light source adapted to emit the white light and a second light source adapted to emit the ultraviolet light, wherein the second light source is positioned facing the light exit window, and wherein the first light source is positioned in the opposite direction. In this embodiment the collimator may be designed such that it is optimized for collimating the white light, while the collimation of UV light is less. To this end, the collimator may for example be an ellipse shaped reflector.

The at least one light source may be adapted to emit visible white light in the wavelength range of 400 to 800 nm.

The at least one light source may be adapted to emit ultraviolet light in the wavelength range of 270 to 350 nm, or 290 to 330 nm, or 300 to 320 nm.

The at least one light source adapted to emit white light and ultraviolet light may be a solid stat light source, such as a light emitting diode (LED) or a laser diode.

Furthermore, the at least one light source may be a phosphor converted ultraviolet light source, i.e. one light source which emits both white and UV light. The phosphor converted ultraviolet light source may for example be an UV LED in which UV light is partly converted to blue, yellow and red light. This means that still a UV component is left which is not converted. Alternatively, the at least one light source adapted to emit white light and ultraviolet light may be a phosphor converted blue light source and a UV light source (two light sources). Alternatively, the at least one light source adapted to emit white light and ultraviolet light may be a UV, a blue, a green, and a red light source (four light sources).

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIG. 1b is a schematic top view of the lighting device of FIG. 1a.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1A:
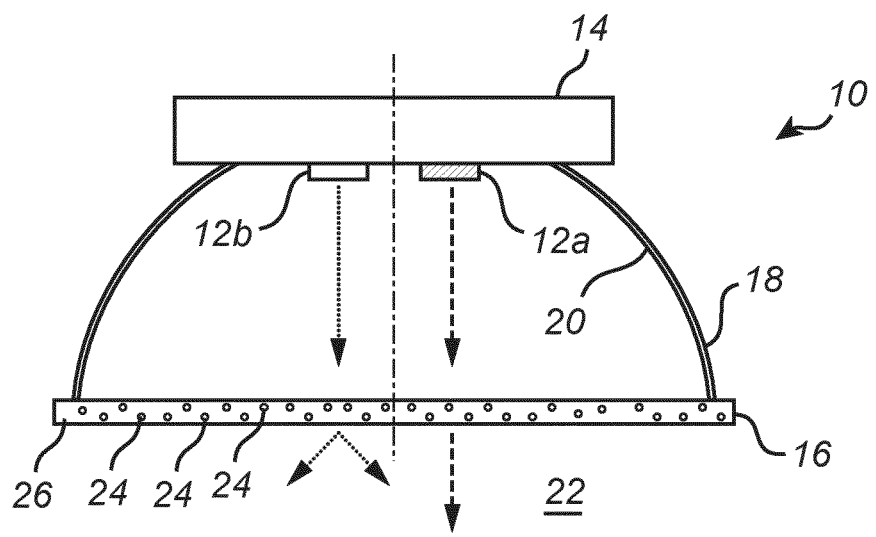
FIG. 1a is a schematic side view of a lighting device according to an embodiment of the present invention.
Figure 1B:
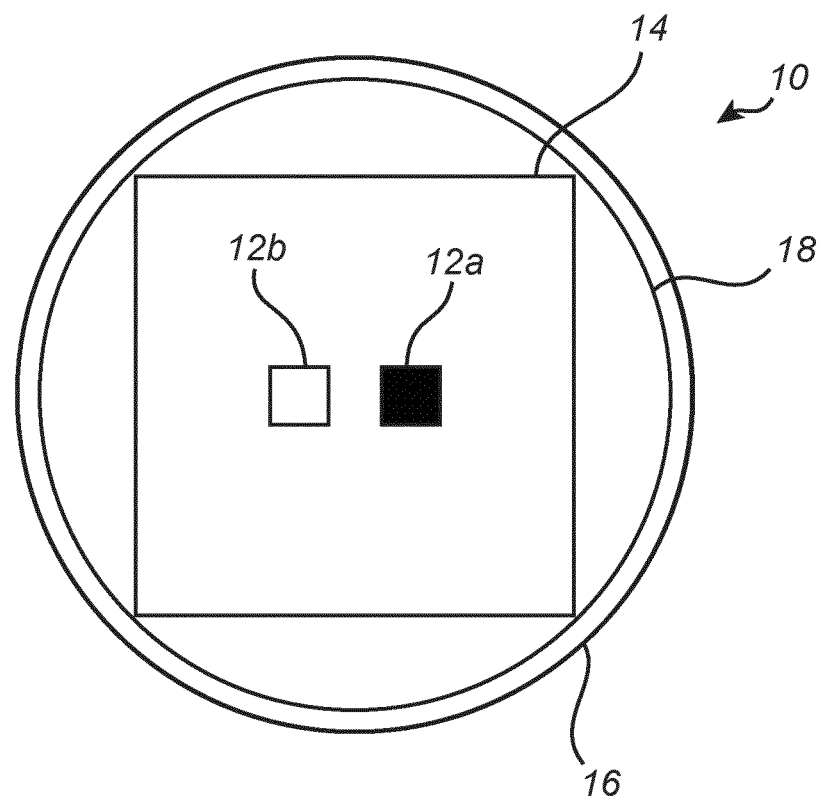

FIGS. 1a-b show a lighting device 10 according to an embodiment of the present invention.

The lighting device 10 comprises at least one light source adapted to emit white light and ultraviolet light (may also be referred to as white light with an ultraviolet component) in the form of a first light source 12a adapted to emit white light and a second light source 12b adapted to emit ultraviolet (UV) light. The first light source 12a may for example be a phosphor converted blue light source or a combination of a blue, a green and a red light source. The white light may be in the wavelength range of 400 to 800 nm. The ultraviolet light may be in the wavelength range of 270 to 350 nm, or 290 to 330 nm, or 300 to 320 nm. The light sources 12a-b may be solid state light sources, such as LEDs or laser diodes. The light sources 12a-b are positioned next to each other on a substrate 14 of the lighting device 10.

The lighting device 10 further comprises a light exit window 16 opposite the light sources 12a-b, and a collimator 18. The collimator 18 may be arranged between the substrate 14 and the light exit window 16.

The collimator 18 is adapted to collimate, i.e. to narrow, for example to make parallel, at least the white light. The collimator 18 may for example be a reflector or a TIR (total internal reflection) optical element. The collimator 18 has a reflective surface 20.

The light exit window 16 is generally adapted to "emit" light from the light sources 12a-b into the ambient 22 of the lighting device 10.

The light exit window 16 in FIGS. 1a-b is spectrally selective. In particular, the light exit window is adapted to scatter the ultraviolet light while allowing the white light to pass without scattering. To this end, the light exit window 16 may comprise nano sized air pockets or glass hollow spheres or small pieces of dichroic mirrors 24 in a matrix material 26, for example silicone. The air pockets or hollow spheres 24 may for example have a size of in the order of 200-400 nm.

In operation of the lighting device 10 of FIGS. 1a-b, the first light source 12a emits white light (exemplified by dashed arrows in the drawings), and the second light source 12b emits ultraviolet light (exemplified by dotted arrows in the drawings). The white light is collimated by the collimator 18, and transmitted through the light exit window 16 without scattering. On the other hand, the ultraviolet light is scattered by the light exit window 16, so that it is spread out. In other words, the ultraviolet light is redistributed or spread to larger angles than the collimated white light.

Figure 2:
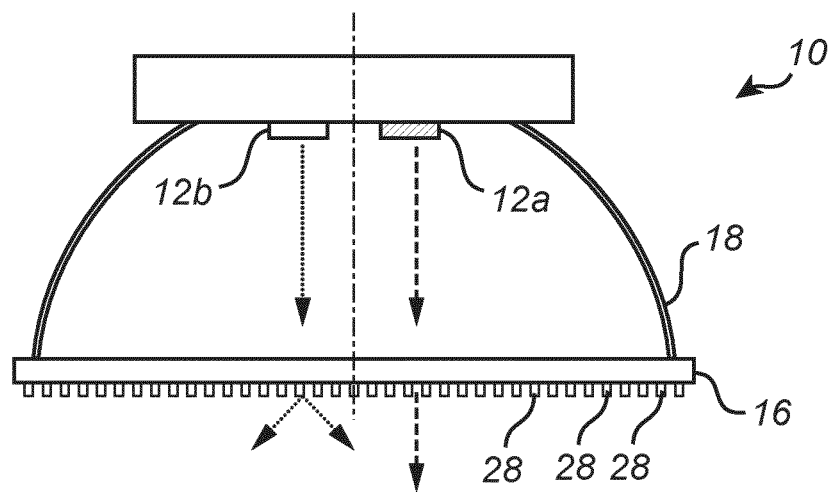
FIG. 2 is a schematic side view of a lighting device according to another embodiment of the present invention.

The lighting device 10 of FIG. 2 differs from the lighting device of FIGS. 1a-1b in that the (spectrally selective) light exit window 16 is adapted to diffract the ultraviolet light while allowing the white light to pass without diffraction. To this end, the light exit window 16 may comprise a plurality of diffracting elements 28. The plurality of diffracting elements 28 may for example form part of a wavelength selective diffractive grating. In operation of the lighting device 10 of FIG. 2, the ultraviolet light is diffracted by the light exit window 16, so that it becomes spread out.

Figure 3:
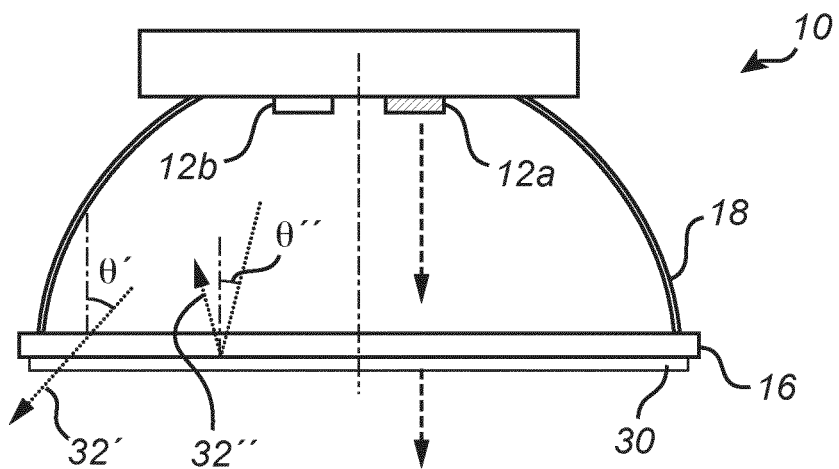
FIG. 3 is a schematic side view of a lighting device according to another embodiment of the present invention.
Figure 3:
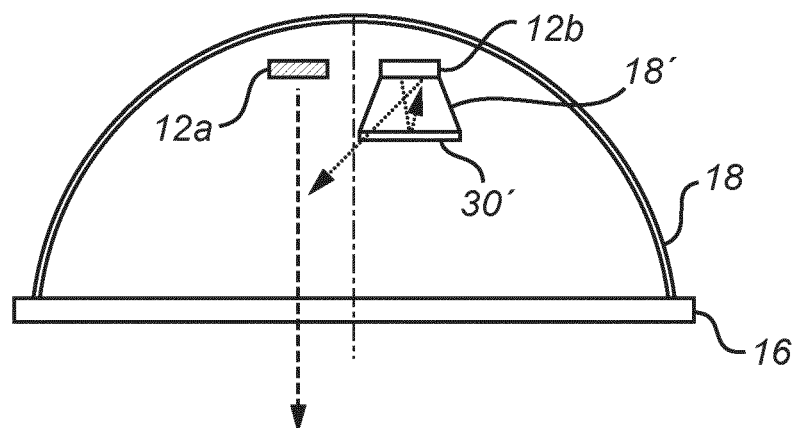

The lighting device 10 of FIG. 3 differs from the lighting device of FIGS. 1a-1b in that the (spectrally selective) light exit window 16 is adapted to reflect ultraviolet light having an angle of incidence smaller than a predefined angle and to transmit ultraviolet light having an angle of incidence larger than the predefined angle and to transmit white light having an angle of incidence smaller than the predefined angle. To this end, the light exit window 16 may comprise a dichroic mirror 30. The predefined angle may for example be 30°. The thickness of the dichroic mirror 30 may for example be selected so that the aforementioned function is achieved. In operation of the lighting device 10 of FIG. 3, ultraviolet light 32' having an angle of incidence θ' larger than the predefined angle is transmitted through the light exit window, whereas ultraviolet light 32" having an angle of incidence θ" smaller than the predefined angle is reflected back into the collimator 18, whereby only spread out ultraviolet light is emitted by the lighting device 10.

In an alternative embodiment to FIG. 3, in order to avoid color over angle problems for the white light component, the lighting device 10 may comprise a separate collimator 18' for the UV light source 12b, wherein a dichroic reflector 30' is placed on top of this collimator 18', avoiding most of the light coming from the white light source 12a interacting with the white light source, as shown in FIG. 3'. The separate collimator 18' may be smaller than, and placed inside, collimator 18.

Figure 4:
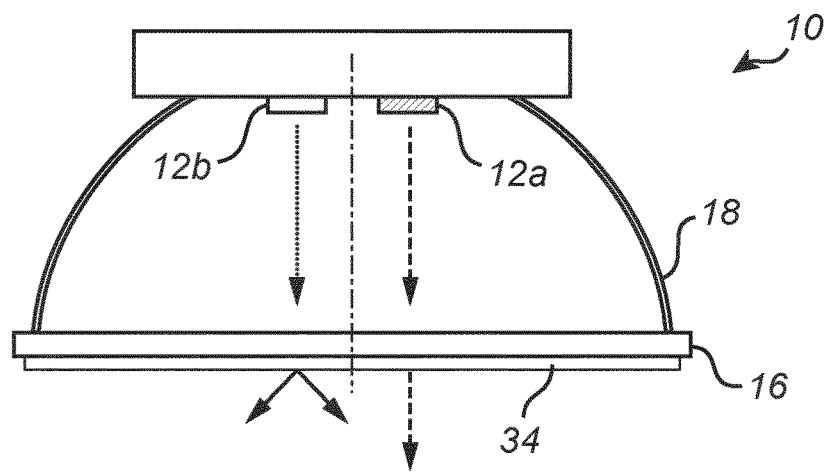
FIG. 4 is a schematic side view of a lighting device according to another embodiment of the present invention.

The lighting device 10 of FIG. 4 differs from the lighting device of FIGS. 1a-1b in that the (spectrally selective) light exit window 16 is adapted to convert the ultraviolet light into ultraviolet light having a peak at a higher wavelength without converting the white light. To this end, the light exit window 16 may comprise a phosphor layer 34. The phosphor layer 34 may for example absorb ultraviolet light having a wavelength of e.g. 250 nm and emit ultraviolet light having a wavelength of e.g. 310-320 nm. In operation, the ultraviolet light emitted by the second light source 12b is converted by the phosphor layer 34 into ultraviolet light having a peak at a higher wavelength. Ultraviolet light having a peak at a higher wavelength is exemplified by solid arrows in the drawings. When being converted, the ultraviolet light is also redistributed to larger angles, whereas the white light is not converted and hence remains collimated.

While FIGS. 1-4 showed embodiments wherein the ultraviolet light is spread at light exit window level, FIGS. 5-9 show embodiments wherein the ultraviolet light is spread at the collimator level.

Figure 5:
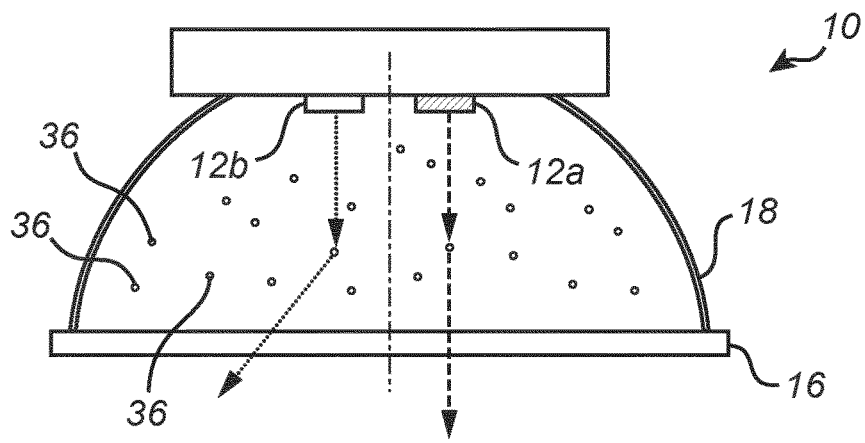
FIG. 5 is a schematic side view of a lighting device according to another embodiment of the present invention.

The lighting device 10 of FIG. 5 differs from the lighting device of FIGS. 1a-1b in that the collimator 18 comprises particles 36 adapted to scatter the ultraviolet light without scattering the white light, i.e. light in the visible range. The collimator 18 may here by a TIR optical element, wherein the particles 36 are distributed throughout the TIR optical element. The light exit window 16 in FIG. 5 is typically not wavelength selective. In operation of the lighting device 10 of FIG. 5, ultraviolet light emitted by the second light source 12b is scattered within the collimator 18, so that it becomes spread out. The white light, on the other hand, is not scattered by the particles 36 and is instead collimated by the collimator 18.

Figure 6:
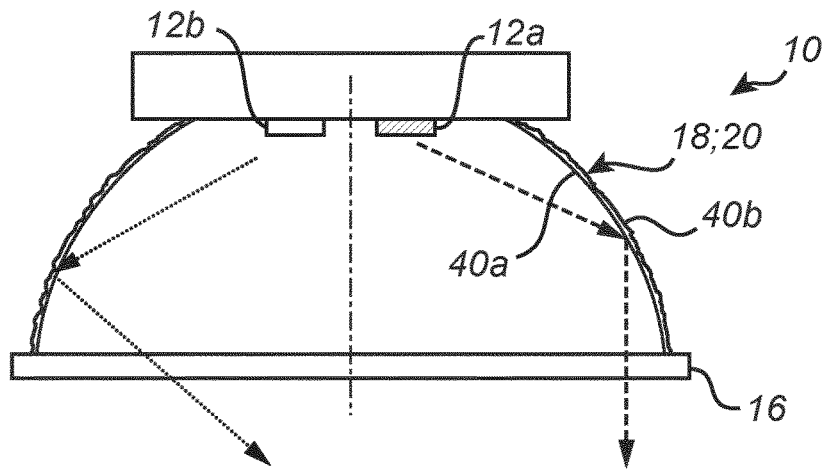
FIG. 6 is a schematic side view of a lighting device according to another embodiment of the present invention.

The lighting device 10 of FIG. 6 differs from the lighting device of FIG. 5 in that the collimator 18 comprises a stack of an inner specular reflective coating 40a and an outer diffuse reflective coating 40b. The stack may constitute the surface 20 of the collimator 18. The specular reflective coating 40a is adapted to specularly reflect the white light and it is transparent for the ultraviolet light. The specular reflective coating 40a may for example specularly reflect light in the range of 350 to 800 nm and be transparent for wavelengths below 350 nm. The specular reflective coating 40a may for example be a silver coating. The diffuse reflective coating 40b is adapted to diffusively reflect the ultraviolet light. The diffuse reflective coating 40b may for example be an aluminium coating on a rough surface. In operation of the lighting device 10 of FIG. 6, the white light is collimated by the specular reflective coating 40a, whereas the ultraviolet light passes the specular reflective coating 40a and is diffused by the reflective coating 40b, so that it becomes spread out.

Figure 7:
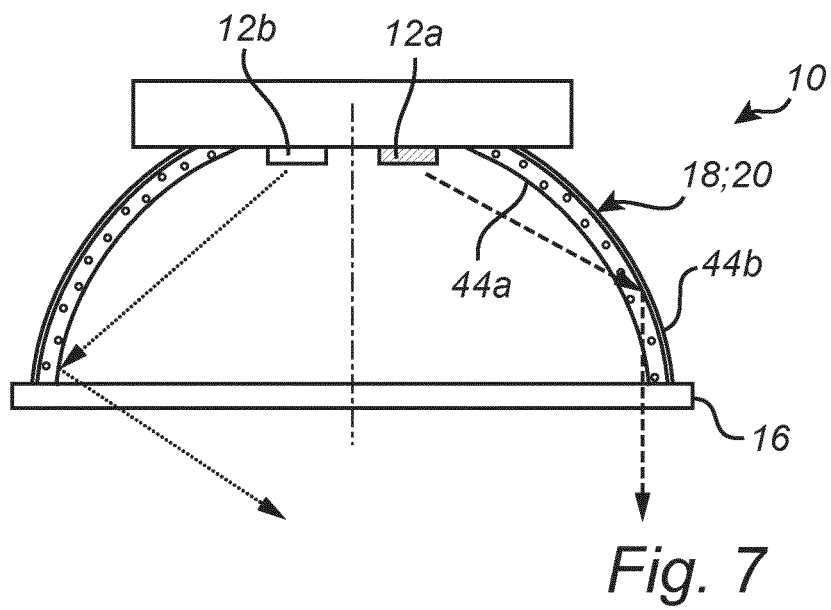
FIG. 7 is a schematic side view of a lighting device according to another embodiment of the present invention.

The lighting device 10 of FIG. 7 differs from the lighting device of FIG. 5 in that the collimator 18 comprises a stack of an inner scattering layer 44a and an outer layer with a specular reflective coating 44b. The stack may constitute the surface 20 of the collimator 18. The scattering layer 44a is adapted to scatter the ultraviolet light. The scattering layer 44a may for example comprise UV scattering particles which are to a large extent transparent to UV, such as nano particles (200-400 nm in size) of silica, quartz such or silicone rubber. The specular reflective coating 44b is adapted to specularly reflect both the white light and the ultraviolet light. The specular reflective coating 44b may for example be an aluminium coating. In operation of the lighting device 10 of FIG. 7, the white light is not scattered by the UV reflecting particles of the scattering layer 44a. Instead, the white light is collimated by the specular reflective coating 44b. On the other hand, the ultraviolet light is scattered by the scattering layer 44a, so that it becomes spread out.

Figure 8:
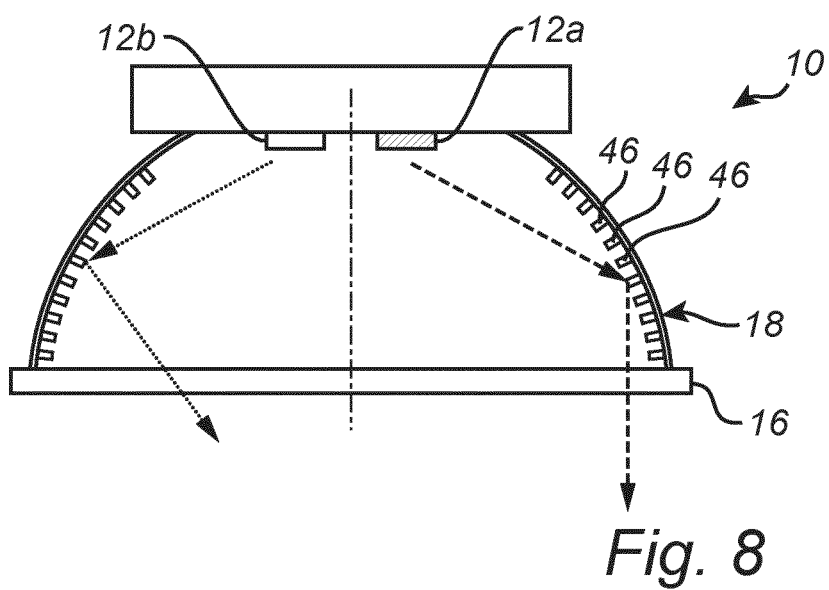
FIG. 8 is a schematic side view of a lighting device according to another embodiment of the present invention.

The lighting device 10 of FIG. 8 differs from the lighting device of FIG. 5 in that the collimator 18 comprises a spectrally selective layer adapted to diffract the ultraviolet light without diffracting the white light. The spectrally selective layer may be a plurality of diffracting elements 46 provided at the collimator surface 20. In operation of the lighting device of FIG. 8, the spectrally selective layer of the collimator 18 diffracts the ultraviolet light, so that it becomes spread out. The white light is not diffracted and hence becomes collimated by the collimator 18.

Figure 9:
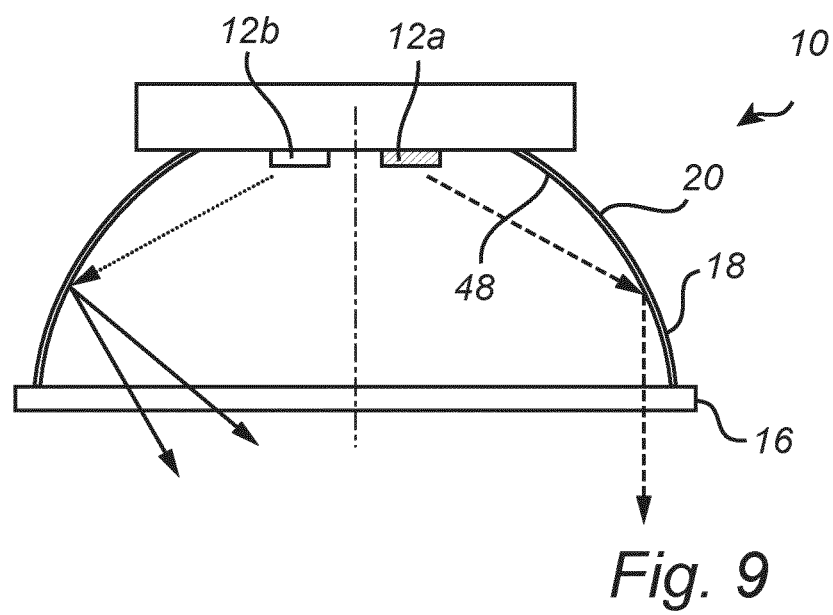
FIG. 9 is a schematic side view of a lighting device according to another embodiment of the present invention.

The lighting device 10 of FIG. 9 differs from the lighting device of FIG. 6 in that the collimator comprises a spectrally selective layer 48 adapted to convert the ultraviolet light into ultraviolet light having a peak at a higher wavelength without converting the white light. The spectrally selective layer 48 may be provided at the collimator surface 20. The spectrally selective layer 48 may be a phosphor layer. In operation of the lighting device of FIG. 9, the ultraviolet light emitted by the second light source 12b is converted by the phosphor layer 48 into ultraviolet light having a peak at a higher wavelength. When being converted, the ultraviolet light is also redistributed to larger angles, whereas the white light is not converted and hence becomes collimated by the collimator 18.

Figure 10:
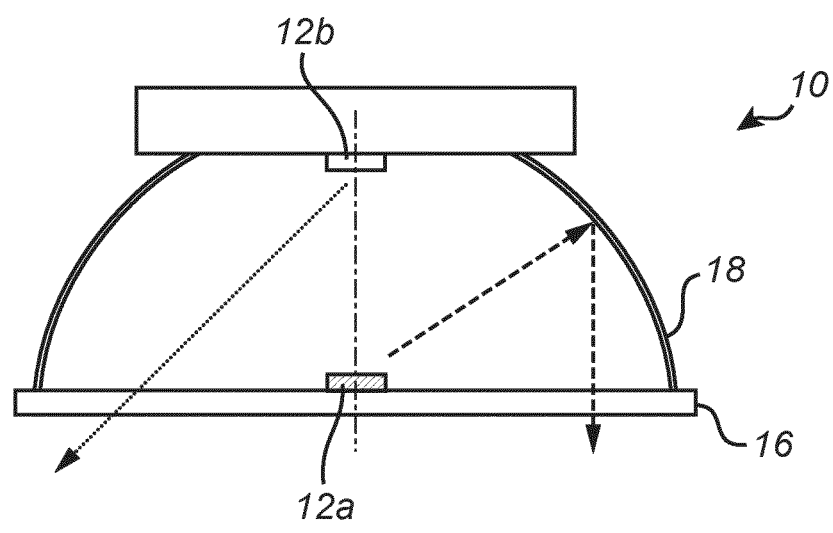
FIG. 10 is a schematic side view of a lighting device according to yet another embodiment of the present invention.

FIG. 10 shows a lighting device 10 according to yet another embodiment, which differs from the lighting device of FIGS. 1a-b in that the first light source 12a adapted to emit white light is positioned on or near the inside of the light exit window 16 and facing the second light source 12b emitting UV light. In other words, the second light source 12b is positioned in indirect mode, whereas the first light source 12a is positioned in direct mode for spreading the ultraviolet light. The collimator 18, for example a reflector, may be adapted such that light originating from source 12a gets collimated whereas the light from source 12b gets out of the reflector without getting collimated. The collimator 18 may for example be an ellipse shaped reflector. The light exit window 16 in FIG. 10 is typically not wavelength selective.

The present lighting device 10 may have a ratio UV to visible of about 1:20 (or below), wherein the amount of "light" in the UV and the visible can be expressed in Watts.

Furthermore, the lighting device 10 typically provides an output of 1000 to 5000 lm.

Furthermore, the correlated colour temperature (CCT) of the lighting device 10 may be in the range of 2000 to 20000 K, or in the range of 2500 to 10000 K, or in the range of 2700 to 8000 K.

Furthermore, the white light may have a colour point in a CIE XYZ colour space and a distance smaller than 25 SDCM (Standard Deviation Color Matching) from the black body line (BBL), or smaller than 15 SDCM from the BBL, or smaller than 10 SDCM from the BBL.

Furthermore, the color rendering index (CRI) of the lighting device 10 may be above 60, or above 70, or above 80 or 90.

Furthermore, in the embodiments of FIGS. 1-3 and 4-9, the first and second light sources 12a-b could be replaced by one light source, such as a phosphor converted ultraviolet light source, for example an UV LED in which UV light is partly converted to blue, yellow and red light.

The present lighting device 10 may for example be positioned in a lamp, a bulb, a light engine, a luminaire, or a light fixture.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device comprising at least one light source adapted to emit white light and ultraviolet light, a collimator adapted to collimate the white light, and a light exit window through which the collimated white light and the ultraviolet light may pass into the ambient, and, wherein the light exit window is spectrally selective to emit the collimated white light while spreading the ultraviolet light; wherein the light exit window is adapted to diffract the ultraviolet light while allowing the white light to pass without substantial diffraction.

2. A lighting device according to claim 1, wherein the light exit window is adapted to scatter the ultraviolet light while allowing the white light to pass without substantial scattering.

3. A lighting device according to claim 1, wherein the light exit window is adapted to reflect ultraviolet light having an angle of incidence smaller than a predefined angle and to transmit ultraviolet light having an angle of incidence larger than the predefined angle and to transmit white light having an angle of incidence smaller than the predefined angle.

4. A lighting device according to claim 1, wherein the light exit window is adapted to convert the ultraviolet light into ultraviolet light having a peak at a higher wavelength without converting the white light.

5. A lighting device according to claim 1, wherein the collimator comprises particles adapted to scatter the ultraviolet light without substantially scattering the white light.

6. A lighting device according to claim 1, wherein the collimator comprises a spectrally selective layer adapted to convert the ultraviolet light into ultraviolet light having a peak at a higher wavelength without converting the white light.

7. A lighting device according to claim 1, wherein the at least one light source comprises a first light source adapted to emit the white light and a second light source adapted to emit the ultraviolet light, wherein the second light source is positioned in a first direction facing the light exit window, and wherein the first light source is positioned in a second direction opposite the first direction.

8. A lighting device according to claim 1, wherein the at least one light source is adapted to emit visible light in the wavelength range of 400 to 800 nm.

9. A lighting device according to claim 1, wherein the at least one light source is adapted to emit ultraviolet light in the wavelength range of 270 to 350 nm.

10. A lighting device according to claim 1, wherein the at least one light source adapted to emit white light and ultraviolet light is a solid state light source.

11. A lighting device comprising at least one light source adapted to emit white light and ultraviolet light, a collimator adapted to collimate the white light, and a light exit window through which the collimated white light and the ultraviolet light may pass into the ambient, and, wherein the light exit window is spectrally selective to emit the collimated white light while spreading the ultraviolet light, wherein the collimator comprises a stack of a specular reflective coating and a diffuse reflective coating, wherein the specular reflective coating is adapted to specularly reflect the white light and is transparent for the ultraviolet light, and wherein the diffuse reflective coating is adapted to diffusively reflect the ultraviolet light.

12. A lighting device comprising at least one light source adapted to emit white light and ultraviolet light, a collimator adapted to collimate the white light, and a light exit window through which the collimated white light and the ultraviolet light may pass into the ambient, and, wherein the light exit window is spectrally selective to emit the collimated white light while spreading the ultraviolet light, wherein the collimator comprises a stack of a scattering layer and a layer with a specular reflective coating, wherein the scattering layer is adapted to scatter the ultraviolet light, and wherein the specular reflective coating is adapted to specularly reflect both the white light and the ultraviolet light.

13. A lighting device comprising at least one light source adapted to emit white light and ultraviolet light, a collimator adapted to collimate the white light, and a light exit window through which the collimated white light and the ultraviolet light may pass into the ambient, and, wherein the light exit window is spectrally selective to emit the collimated white light while spreading the ultraviolet light, wherein the collimator comprises a spectrally selective layer adapted to diffract the ultraviolet light without substantially diffracting the white light.

* * * * *